March 14, 1967  H. A. VIETS ETAL  3,309,086
PINFALL DETECTING APPARATUS

Filed April 13, 1964  5 Sheets-Sheet 1

INVENTORS
HARRY A. VIETS
STEPHEN C. PEPLIN
BY
ATTORNEY

INVENTORS
HARRY A. VIETS
STEPHEN C. PEPLIN
BY
ATTORNEY

United States Patent Office 3,309,086
Patented Mar. 14, 1967

3,309,086
PINFALL DETECTING APPARATUS
Harry A. Viets, 34301 Puth Drive, Avon, Ohio 44011, and Stephen C. Peplin, 5071 Evergreen Drive, North Olmsted, Ohio 44070
Filed Apr. 13, 1964, Ser. No. 359,147
9 Claims. (Cl. 273—54)

This invention relates to apparatus for detecting fallen pins on a bowling alley pin deck, and more particularly to pinfall detecting apparatus for use with an automatic pin-spotter.

In copending application Ser. Nos. 134,809, filed Sept. 7, 1961, and 221,701, filed Sept. 6, 1962, the latter being abandoned, pinfall detecting systems are disclosed in which a member carrying a plurality of spaced standing pin detecting devices is swept across the tops of bowling pins on a bowling alley pin deck such that each detecting device is adapted to sense standing pins within a predetermined zoned area of the pin deck. The detecting devices are adapted to produce a number of electrical pulses equal to the number of standing pins, and these pulses are thereafter subtracted from ten in suitable circuitry to determine the number of fallen pins.

The necessity for detecting pins within predetermined zoned areas covering the entire pin deck becomes apparent when it is remembered that upon delivery of a bowling ball, pins will sometimes slide on the deck from their correctly spotted positions without being knocked over. Consequently, systems employing limit switches or the like on the gripper arms of an automatic pin-spotter, or switch devices located at the pin spots on the deck, are unsatisfactory as a completely accurate and foolproof method for determining pinfall.

A scanning member of the type described above which carries pin detecting elements is normally used in conjunction with an automatic pin-spotter. During a standing pin detection procedure, it is necessary for the scanning member to pass over the tops of the pins and beneath the elevated pin-spotter frame. However, when the detecting apparatus is not in use, and particularly during a pin-spotting operation, the scanning member must be stored at a location where it will be out of the path of downward travel of the pin-spotter frame. At the same time, it must be stored in a position where it cannot be struck by flying pins.

The problems involved in meeting these requirements are complicated by the fact that the areas above the pin deck available for storage of the scanning member without interfering with operation of the pin-spotter are very limited. In certain types of pin-spotters, space is available adjacent the kickbacks for storage of the scanning member during a pin-spotting operation, however this may require additional apparatus for elevating the scanning member when not in use to prevent the possibility of its being struck by flying pins. In the case of other pin-spotters, even the space adjacent the kickbacks is not available for storage.

Therefore, as one important object, the present invention seeks to provide improved mechanism for moving an elongated member carrying pin detecting apparatus across the tops of bowling pins, which mechanism is adaptable for use with all types of pin-spotters and which stores the scanning member, when not in use, in front of the pin-spotting mechanism where it will not interfere with the pin-spotting operation and cannot readily be struck by flying pins.

While the use of spaced pin detecting devices on a member which moves across the tops of pins is entirely satisfactory for its intended purpose, it is conceivable that a pin may slide on the pin deck to a position where it straddles two of the zones covered by adjacent detecting devices on the scanning member which sweeps across the tops of the pins. If this should occur, a single pin conceivably could be detected by more than one detecting device, thereby producing two pulses for the single pin; whereas a single pulse is desired.

Accordingly, as another object, the invention provides apparatus wherein a scanning member having spaced pin detecting devices is moved across the tops of the pins in one direction, followed by movement of the scanning member in the opposite direction with the detecting devices shifted axially along the scanning member. In this manner, the zoned areas covered by the detecting devices during the forward sweep of the scanning member are shifted with respect to those covered during the reverse sweep of the scanning member. This assures that if, for example, a single pin is detected by two detecting devices during one stroke, it will be detected only by a single device during the return stroke. By applying the pulses produced during the forward and return strokes of the scanning member to suitable circuitry, the minimum number of pulses achieved during either the return or forward stroke can be derived, this number of pulses being a true indication of the number of standing pins. These pulses are thereafter used, as mentioned above, in suitable circuitry which subtracts them from ten in order to determine the number of fallen pins.

Finally, a further object of the invention is to provide pinfall detecting apparatus employing mechanism which moves in a horizontal plane adjacent the tops of the pins and which carries a photocell arrangement for detecting standing pins on the deck, thereby eliminating any need for electrically detectable devices in the pins themselves or detecting devices which physically contact the tops of the pins.

In accordance with this latter aspect of the invention, a photocell may be suspended at one end of the scanning member, and a light source suspended from the opposite end and arranged to direct a beam of light against the photocell such that as the scanning member is swept across the pins, the light beam will intercept the standing pins, thereby causing the photocell to produce a number of electrical pulses equal to the number of standing pins. The light beam is arranged at such an angle with respect to the scanning member that it will not intercept any more than one pin at a time. However, in order to improve the accuracy of the device in the event that, due to sliding pins, the light beam intercepts two pins simultaneously, a second photocell and light beam may be employed in conjunction with the first. This second photocell and light beam arrangement will be disposed on the member such that its light beam is disposed at an angle different from that of the first. Alternatively, a single photocell and light beam may be employed and arranged such that the angularity of the light beam is changed by reversal of movement of the scanning member in a reciprocating scanning stroke across the pins. In either case, the larger number of pulses produced is utilized as the true standing pin count. These pulses are then used as described above in suitable circuitry which subtracts them from ten in order to determine the number of fallen pins.

As an alternative to a scanning member which sweeps across the tops of the pins, the photocell and light source may be moved along opposite sides of the pin deck on separate carriages driven in synchronism to maintain the required angularity between the two.

The above and other objects and features of the invention will become apparent from the following detailed description taken in connection with the accompanying drawings which form a part of this specification, and in which.

Figure 1:
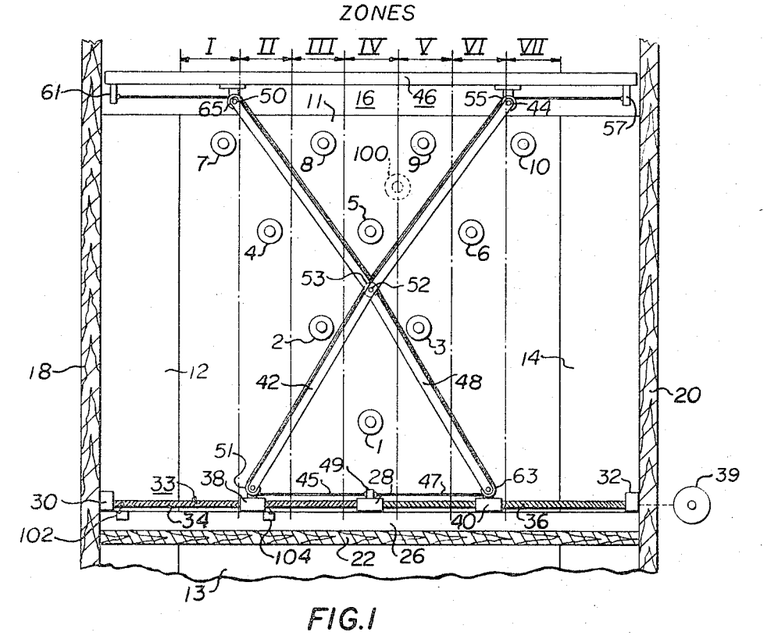
FIGURE 1 is a top view of a bowling alley pin deck showing the mechanism, in its extended position, for sweeping a member carrying standing pin detecting devices across the tops of pins on the pin deck.
Figure 2:
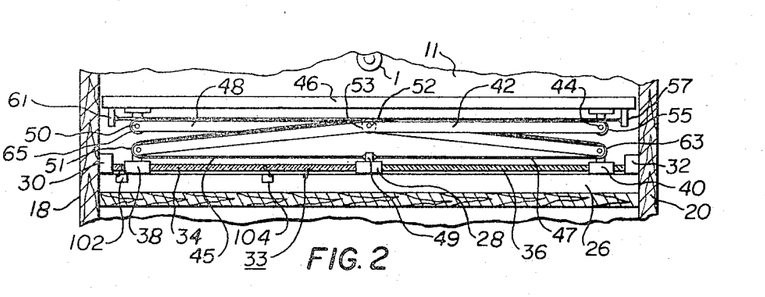
FIG. 2 is a top view of the mechanism of FIG. 1 in its retracted position.
Figure 3:
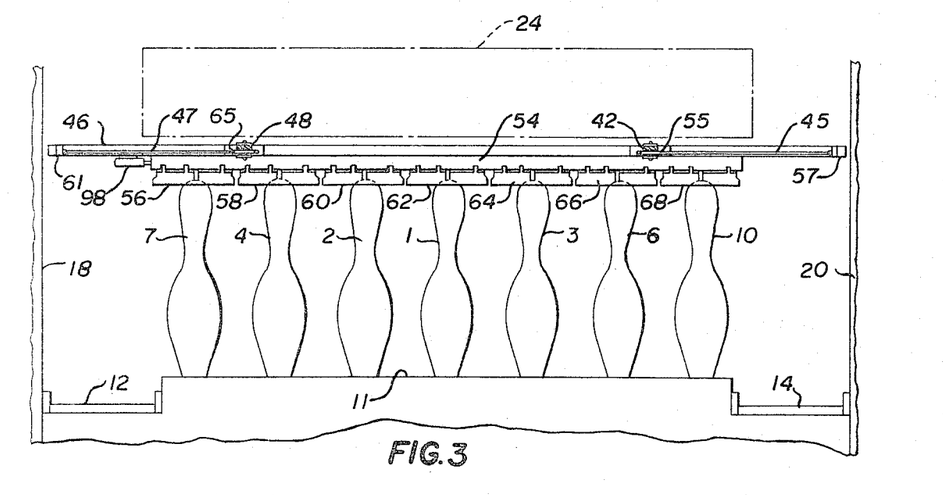
FIG. 3 is an end view of the detecting apparatus of FIG. 1.

Referring now to the drawings, and particularly to FIGS. 1, 2 and 3, the usual bowling alley 13 is shown having a pin deck 11 with ten pins positioned thereon in the usual triangular configuration and numbered 1 through 10. On either side of the pin deck 11 are gutters 12 and 14, while behind the pin deck 11 is a pit 16. On either side of the pin deck 11 are kickbacks 18 and 20 which serve, among other things, to separate adjacent bowling alleys. Extending between the kickbacks 18 and 20 is a facing board 22 which, in accordance with the usual bowling alley construction, covers an automatic pin-spotter and its associated mechanism in its raised position, but does not extend down far enough toward the alley to obstruct the view of the pins positioned thereon. In FIG. 3, the pin-spotter mechanism is schematically illustrated by the reference numeral 24.

In abutment with the facing board 22, the lower edge thereof, is an elongated member 26 which supports three bearing blocks 28, 30 and 32. As shown, the member 26 is carried between the kickbacks 18 and 20; while the bearing blocks 28, 30 and 32 rotatably support a screw 33. The screw 33 is divided into two parts 34 and 36 on either side of the central bearing blocks 28, the threads on the part 34 being reversed with respect to those on part 36. The screw 33 comprising parts 34 and 36 is driven by means of a motor, schematically illustrated at 39. Carried on part 34 of the screw 33 is a first follower 38, while a second follower 40 is carried on the screw part 36. The followers 38 and 40 are threadedly engaged with their respective screw parts and are spaced apart in equal amounts from the center bearing block 28. Assuming that the followers 38 and 40 cannot rotate, it will be appreciated that upon rotation of the screw parts 34 and 36 in one direction, the followers 38 and 40 will be caused to converge; while rotation of the screw parts in the opposite direction will cause the followers 38 and 40 to diverge.

Pivotally connected to the follower 38 is a first crossbar 42 which is pivotally connected at its other end 44 to a scanning bar, schematically illustrated at 46. In a somewhat similar manner, a bar 48 is pivotally connected at its one end to the follower 40 and at its other end 50 to the scanning bar 46. As shown, the two bars 42 and 48 are pivotally connected intermediate their ends as at 52 to provide a scissors-like arrangement. Upon converging movement of the followers 38 and 40 with the screw parts 34 and 36 rotating in one direction, the bar 48 will rotate in a clockwise direction about pivot point 52 while bar 42 rotates in a counterclockwise direction, thereby causing the scanning bar 46 to move outwardly over the pins, starting from the number 1 pin and ending at the pit area 16. Likewise, upon diverging movement of the followers 38 and 40 when the screw parts 34 and 36 rotate in the opposite direction, the scanning bar 46 will be caused to move from the pit area where it is fully extended as shown in FIG. 1 to its retracted position shown in FIG. 2 where the scanning bar 46 is ahead of the number 1 pin. Furthermore, by virtue of the equal spacing of followers 38 and 40 from the central bearing block 28 and the equal lengths of the bars 42 and 48, the scanning bar 46 will tend to remain perpendicular to the long transverse dimension of the alley as it moves outwardly over the pins and backwardly to its retracted position shown in FIG. 2. In order to insure that the scanning bar 46 remains in a central location and does not change angles as it traverses the pin deck, a pair of taut cables 45 and 47 are provided. Cable 45 is anchored at one end to a pin 49 on the central bearing block 28. From pin 49, it extends about a sheave 51 carried on follower 38, a sheave element 53 at the central pivot point 52 and sheave 55 at end 44 to an anchor pin 57 on scanning bar 46. In a similar manner, cable 47 has its opposite ends connected to anchor pins 49 and 61 and extends around sheaves 63, 53 and 65.

In FIG. 3, it can be seen that the scanning bar 46 moves in a horizontal plane between the pin-spotter mechanism 24 in its elevated position and the tops of the pins on the deck 11. During a pin-spotting operation when the frame of the pin-spotter mechanism 24 is lowered, the scanning bar and its associated mechanism will be in the retracted position shown in FIG. 2 where the scanning bar 46 is ahead of the number 1 pin and out of the path of travel of the pin-spotter frame.

Figure 4:
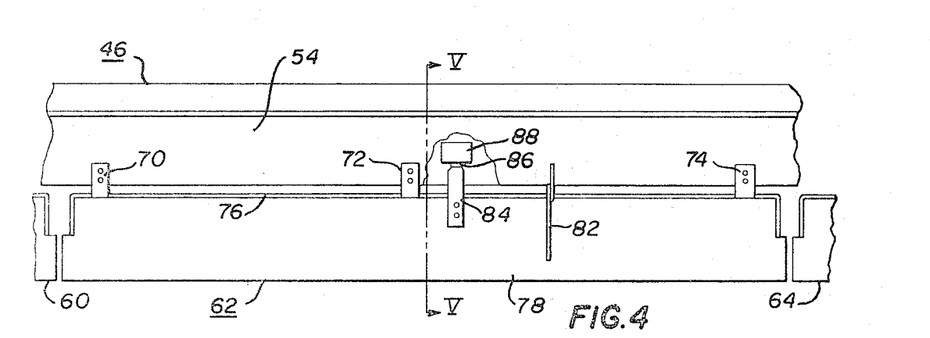
FIG. 4 is an enlarged view of the standing pin detecting mechanism shown in FIG. 3.
Figure 5:
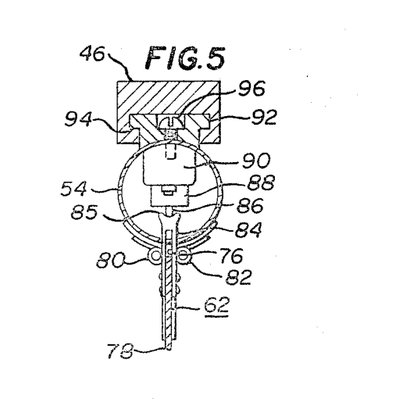
FIG. 5 is a cross-sectional view taken substantially along line V—V of FIG. 4.

With specific reference, now, to FIGS. 3, 4 and 5, it will be seen that the scanning bar 46 has suspended therefrom a tubular member 54. Suspended from the tubular member 54, in turn, are a plurality of standing pin detecting elements 56, 58, 60, 62, 64, 66 and 68. As the scanning bar 46 moves outwardly over the tops of the pins and then backwardly in the manner described above, each of the detecting devices 56–68 covers a predetermined zoned area of the pin deck 11, these zones being identified as Zone I through Zone VII in FIG. 1.

The detecting device 62, for example, is shown enlarged in FIGS. 4 and 5. Carried on the underside of the tubular member 54 are three hinges 70, 72 and 74. These hinges support, for pivotal movement, an inverted, generally U-shaped wire member 76. The wire member, in turn, is connected to a lightweight flapper member 78. It will be appreciated from an examination of FIG. 3 that the flapper members 78 on each of the detecting devices 56–68 are adapted to engage the tops of standing pins within their associated predetermined zoned areas. The flapper members 78 are formed from extremely thin, lightweight plastic material such that as they contact the tops of standing pins, they will be caused to rotate about the hinges 70–74 without knocking over the pins. As shown in FIG. 5, each flapper 78 is normally held in a generally vertical direction by means of coil springs 80 and 82, each of which has a first leg engaging a respective side of the flapper 78 and a second leg engaging the underside of the tubular member 54.

Pivoted or otherwise securely fastened to the flapper 78 intermediate its ends is an upstanding projection 84 adapted to engage the actuating plunger 86 of a switch 88. The switch 88, in turn, is supported on the underside of a block 90 suspended from the upper inside surface of the tubular member 54. With the arrangement shown, engagement of the flapper 78 with the top of a standing pin will cause it to rotate about the hinges 70–74, whereupon the cam surface 85 of upstanding member 84 will trip the switch 88. This produces a pulse, indicating the presence of a standing pin.

The tubular member 54 is suspended from a generally T-shaped member 92 (FIG. 5) slidable within a cooperating guideway 94 in the scanning bar 46. The tubular member 54 and the blocks 90 which carry the switch 88 are secured to the member 92 by means of screws 96, substantially as shown. With the arrangement illustrated, the entire assembly of tubular member 54 and the detectors 56–68 may be shifted to the right or left as viewed in FIG. 3 by virtue of the sliding engagement between member 92 and the scanning bar 46.

As best shown in FIG. 3, one end of the tubular member 54 is connected to the actuating plunger of a solenoid 98 carried on the underside of the scanning bar 46. Thus, when the solenoid 98 is energized in one sense, the tubular member 54 and the detectors 56–68 carried thereby will be shifted to the right, for example; while energization of the solenoid 98 in the opposite sense will cause movement of the tubular member 54 and the detecting devices which it carries to the left.

The desirability for detecting devices which can be shifted in position may best be understood by reference to FIG. 1. If a pin should slide to a position where it is directly between two adjacent flappers 78, it will cause both of those flappers to rotate and produce pulses; whereas it is desired to produce only a single pulse. Such a pin is schematically illustrated in FIG. 1 at 100. If a pin were to slide to this exact position, it would be detected by the detecting device 62 as well as detecting device 64 shown in FIG. 3. Accordingly, in order to avoid any possibility whatever of a double count for a single pin, the tubular member 54 is slideable on the scanning bar 46 upon energization of the solenoid 98. In this manner, the predetermined zoned areas covered by the detecting devices 56–68 during the return stroke of the scanning bar can be shifted with respect to those zoned areas covered by the same detecting devices on the outward stroke. Energization of the solenoid 98 is controlled by a pair of limit switches 102 and 104 shown in FIGS. 1 and 2. The limit switch 104 is actuated when the scanning bar 46 reaches its outermost position; whereas the limit switch 102 is actuated when the scanning bar is in its fully retracted position shown in FIG. 2. If a pin should slide to the position indicated by the reference numeral 100 in FIG. 1, pulses will be produced by detecting devices 62 and 64 for this single pin during the outward stroke of the scanning bar 46. When, however, the tubular member 54 and detecting devices 56–68 are shifted, say, to the right as viewed in FIG. 1, the pin in position 100 will be detected only by device 62. Consequently, the cumulative number of pulses produced by the detecting devices during their return stroke will be less than those produced during the outward stroke, the smaller number being the true standing pin count. As a result, it becomes necessary to determine the smallest number of pulses counted during either the outward or return stroke of the scanning bar 46.

Figure 6:
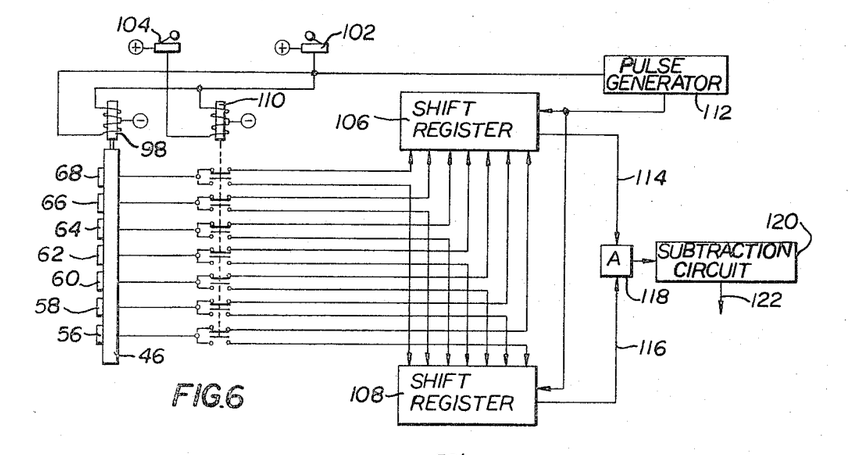
FIG. 6 is a schematic diagram of the control circuitry for the system shown in FIGS. 1–5.

Circuitry for accomplishing a determination of the smallest number of pulses is shown in FIG. 6. When limit switch 102 is tripped, it will, for example, shift the tubular member 54 and the detecting elements 56–68 carried thereby to the left as shown in FIG. 1. On the other hand, when limit switch 104 is tripped, it will energize solenoid 98 to reverse the position of the tubular member 54 and the detecting elements carried thereby.

Included in the circuitry of FIG. 6 are two shift registers 106 and 108. The shift register 106 is employed during the outward stroke of the scanning bar 46; whereas the shift register 108 is employed on the return stroke. When limit switch 102 is contacted by follower 38, a relay 110 is energized to move its contacts into the positions shown whereby the detecting devices 56–68 are all connected to the shift register 106. On the other hand, when limit switch 104 is engaged as the scanning bar 46 reaches its lowermost position, the relay 110 is energized in the opposite sense to reverse the positions of the contacts on relay 110 whereby the detecting devices 56–68 are connected to shift register 108.

The shift registers 106 and 108 are the subject of copending application Ser. No. 325,371, filed Nov. 21, 1963. By reference to that application, it will be seen that the circuits 106 and 108, in effect, store a number of pulses equal to the number of standing pins. That is, each time and associated detecting device 56–68 passes over the top of a standing pin, it will produce an electrical pulse which is stored in the shift register 106 or 108. Upon outward movement of the scanning bar 46, the pulses are stored in shift register 106; whereas upon the return movement of the scanning bar 46, the pulses are stored in shift register 108.

In order to derive the pulses stored in shift registers 106 and 108, it is necessary to apply an auxiliary source of input pulses thereto. This function is achieved by means of a pulse generator 112 which is actuated after a complete outward and reverse scanning motion of the bar 46 when follower 38 contacts limits switch 102. When limit switch 102 is thus contacted at the completion of an outward and reverse scanning cycle, the pulse generator 112 will produce pulses which are applied to the shift registers 106 and 108. The shift registers will, therefore, produce output pulses on leads 114 and 116, respectively, in synchronism, the number of pulses produced on leads 114 and 116 being equal to that number stored in their associated shift registers.

Let us assume, for example, that there are six pins which remain standing after the delivery of the first ball in a frame and that one of the standing pins has moved to the position indicated by the reference numeral 100 in FIG. 1. Under these circumstances, both of the detecting devices 62 and 64 will produce pulses for the single pin 100 upon the outward stroke of scanning bar 46. When the scanning bar 46 reaches its outermost position, the solenoid 98 is energized in the manner described above to shift the tubular member 54 to the right. Therefore, upon the return stroke of the scanning bar 46, the pin 100 will be detected only by the detecting device 62. The result is that there will be seven pulses stored in the shift register 106 and six pulses stored in shift register 108. When the pulse generator 112 is actuated at the completion of the scanning cycle, pulses will be delivered on leads 114 and 116. These pulses are applied to an AND circuit 118; and as the first six pulses from the circuits 106 and 108 arrive at circuit 118, it will produce six output pulses which are applied to a subtraction circuit 120. When, however, the seventh pulse arrives from shift register 106, a corresponding pulse will not be present on lead 116 since the AND circuit 118 requires two simultaneous input pulses before it produces an output pulse. Thus, only the true standing pin count is applied to the subtraction circuit 120. These pulses are subtracted from ten in circuit 120 to derive on lead 122 the number of fallen pins which, in this case, is four.

Figure 7:
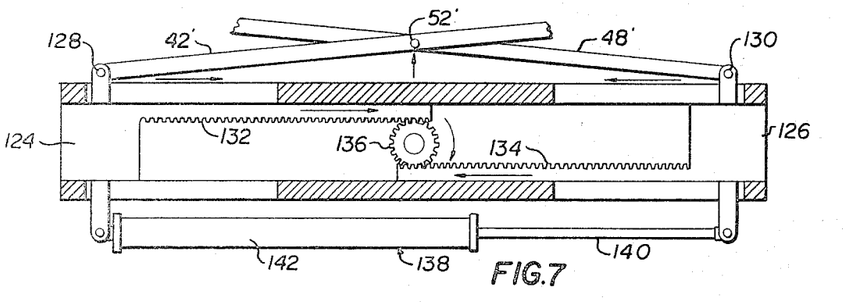
FIG. 7 is a top view of an alternative mechanism for sweeping a member carrying standing pin detecting devices across the tops of bowling pins.

In FIG. 7 an alternative embodiment of the drive mechanism for the scanning bar 46 is shown which again includes a pair of arms 42′ and 48′ pivoted intermediate their ends as at 52′. In this case, however, the screw drive of FIGS. 1 and 2 is replaced by means of a pair of slideable carriages 124 and 126. The carriage 124 is pivotally connected to the arm 42′ as at 128; while carriage 126 is pivotally connected to arm 48′ as at 130. The carriages 124 and 126 are provided with racks 132 and 134, respectively, which engage the teeth of a central pinion gear 136. If desired, the carriages 124 and 126 may be moved together or forced apart by rotating the gear 136, thereby moving the scanning bar 46 outwardly or backwardly in the same manner as described in connection with FIG. 1. On the other hand, the carriages 124 and 126 may be actuated by means of an air cylinder mechanism 138 having its piston rod 140 connected to carriage 126 and its cylinder 142 connected to carriage 124. With this arrangement, it will be appreciated that pressurization of the cylinder 142 in one direction will cause converging movement of the carriages 124 and 126; while pressurization of the cylinder 142 in the opposite sense will cause diverging movement of the carriages 124 and 126 to cause outward and reverse movement of the bar 46, respectively.

Figure 8:
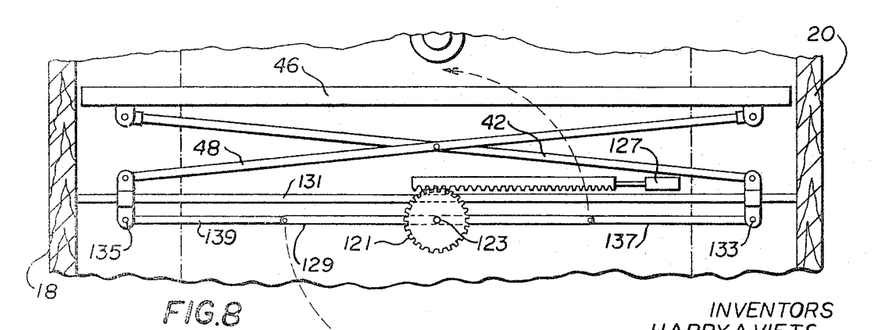
FIG. 8 is a top view of still another mechanism for sweeping a scanning member across the tops of pins, which mechanism imparts a substantially linear motion to the scanning member.

In FIG. 8, a still further arrangement is shown for moving the scanning bar 46 over the tops of the pins. This mechanism is designed to impart a substantially uniform rate of travel to the scanning bar as it moves over the pins and includes a gear 121 carried intermediate the edges of the gutters 12 and 14 are rotatable about a vertical axis 123. The gear 121 is meshed with a rack 125 driven by means of a pneumatic cylinder 127. Secured to the gear 121 so as to rotate therewith is a bar 129. Beneath the gear 121 and the bar 129 carried thereby is a slide 131 extending between the kickbacks 18 and 20. Slideable on the slide 131 are members 133 and 135 which correspond, in effect, to the followers 38 and 40 of FIGS. 1 and 2. Pivotally connected to the members 133 and 135 are the bars 42 and 48 which carry, at their forward ends, the scanning bar 46. Thus, as in the embodiment of FIGS. 1 and 2, converging movement of members 133 and 135 will cause the scanning bar 46 to move outwardly over the pins, while diverging movement of members 133 and 135 will cause reverse movement of the scanning bar.

Pivotally connected to the ends of the bar 129 are linkages 137 and 139 having their opposite ends connected to the members 133 and 135, respectively. Thus, upon rotation of the gear 121 in a counterclockwise direction, for example, the members 133 and 135 will be pulled inwardly toward the center of the alley, causing the scanning bar 46 to move outwardly over the pins at a more uniform rate of travel than is the case with the previous embodiments.

Figure 9:
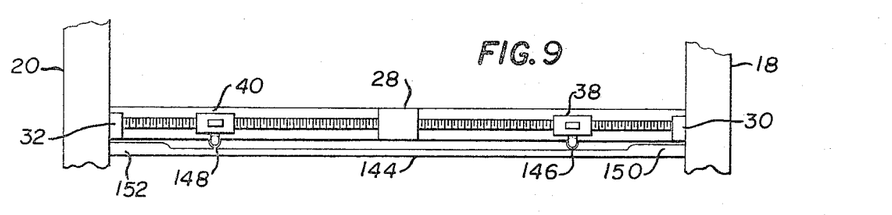
FIG. 9 is an illustration of a manner in which a member carrying standing pin detecting devices may be elevated while in its retracted position.

In certain cases, it may be desirable to elevate the bar 46 above the lower edge of the facing plate 22 when it is fully retracted. For this purpose, the arrangement shown in FIG. 9 may be provided wherein a cam surface 144 is provided beneath the member 26 of FIGS. 1 and 2. In this arrangement, the followers 38 and 40 are provided with circular cam followers 146 and 148 which ride on the cam surface 144. As shown, the cam surface 144 has raised portions 150 and 152 at its opposite ends. Thus, diverging movement of the followers 38 and 40 upon the return stroke of the scanning bar 46 will progress in the usual manner until the scanning bar 46 has passed the number 1 pin. At this point, the circular cam followers 146 and 148 will engage the raised portions 150 and 152 to thereby rotate the member 26, which is now pivotally supported on the kickbacks 18 and 20, upwardly. In this process, the member 26 carries with it the bars 42 and 48 as well as the scanning bar 46 whereby these elements are raised upwardly.

Figures 10, 11:
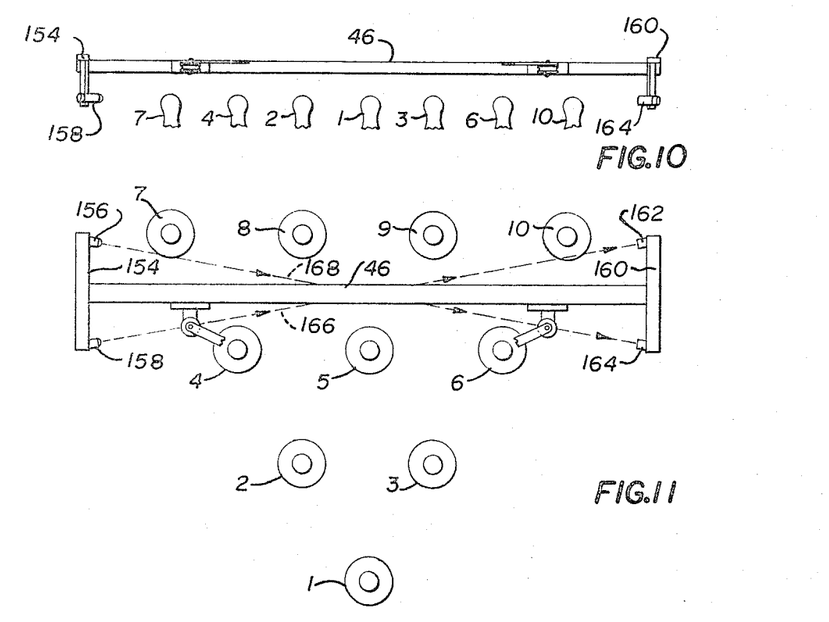
FIGS. 10 and 11 are side and top views, respectively, of an alternative embodiment of the invention employing a scanning bar which carries photoelectric devices for the purpose of detecting standing pins.

With reference now to FIGS. 10 and 11, a further embodiment of the invention is shown which again includes a scanning bar 46 which is moved outwardly and backwardly over the pins 1–10 in an arrangement similar to that shown in FIG. 1. In this case, however, detecting devices are not spaced along the length of the scanning bar 46, nor is there any physical contact with the pins. Rather, at one end of the scanning bar is a cross member 154 which carries at its opposite ends a pair of lamps 156 and 158. On the other end of the scanning bar 46 is a second cross member 160 which carries at its opposite ends photoelectric devices 162 and 164. The lamp 158 produces a beam of light which normally is directed against the photocell 162 such that the beam of light from lamp 158, schematically illustrated at 166, crosses the pin deck 11 at an angle. Similarly, the lamp 156 produces a beam of light 168 which crosses the pin deck 11 at an angle before intersecting the photoelectric device 164.

The lamps 156, 158 and photocells 162, 164 are positioned beneath the scanning bar such that the light beams 166 and 168 will intercept the tops of standing pins as the scanning bar 46 moves outwardly over the tops of the pins. In this process, it will be appreciated that each time the light beam 166, for example, is interrupted by a pin, the photocell 162 will produce a pulse. The same action will occur when the light beam 168 is interrupted. Since a condition may occur wherein two pins are aligned along the light beam 166, for example, the second light beam 168 becomes necessary to insure that all standing pins are detected. In this latter case, however, it now becomes necessary to provide circuitry for determining the largest number of pulses produced by photocells 162 and 164 since if two pins are aligned along a light beam, the photocell will produce a single pulse, whereas two are desired.

Figure 12:
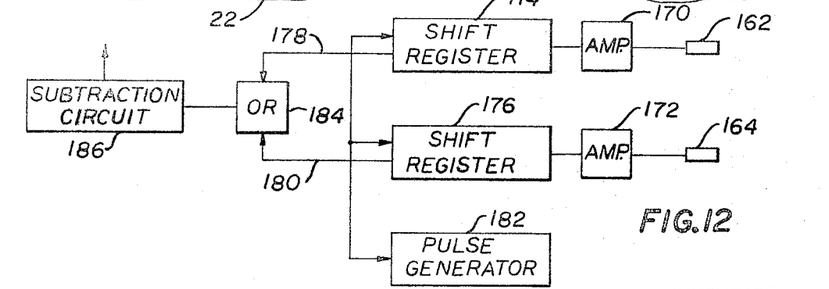
FIG. 12 is a schematic diagram of the control circuitry for the system of FIGS. 10 and 11.

Such circuitry is shown in FIG. 12 and includes the photocells 162 and 164 connected through amplifiers 170 and 172, respectively, to shift registers 174 and 176. The shift registers 174 and 176 operate in the same manner as circuits 106 and 108 in FIG. 6 and are actuated to produce output pulses on leads 178 and 180 by means of a pulse generator 182. The pulse generator may, for example, be actuated at the completion of a scanning cycle by actuation of a limit switch, not shown, similar to limit switch 102 of FIG. 1. In this case, however, the pulses on leads 178 and 180 are applied to an OR circuit 184, rather than an AND circuit as in FIG. 6. As is well known to those skilled in the art, an OR circuit will produce an output pulse whenever one or more pulses are applied to its inputs. Let us assume, for example, that due to two pins aligned along light beam 168, photocell 164 produces only five pulses for six standing pins, while photocell 162 produces the required six. The six and five pulses, respectively, are stored in shift registers 174 and 176. Upon actuation of pulse generator 182 at the completion of a scan in one direction, the first five pulses from circuits 174 and 176 will arrive at OR circuit 184 simultaneously, thereby applying five pulses to subtraction circuit 186. Upon arrival of the sixth pulse from shift register 174, this pulse will pass through OR circuit 184, notwithstanding the absence of a pulse from circuit 176. Consequently, the required six pulses will be applied to the subtraction circuit 186. Preferably, both of the lamps 156 and 158 will be energized simultaneously to complete the scanning cycle during the forward stroke of the scanning bar 46, the reverse stroke serving only to return the scanning bar to its starting position. However, if desired, only one lamp can be energized on the forward stroke and the other on the reverse stroke with the same overall effect.

Instead of using two photocells and two lamps, it is also possible to use a single set on a scanning bar which changes angularity upon reversal to effect scanning at different angles as the bar moves outwardly and then returns.

Figure 13:
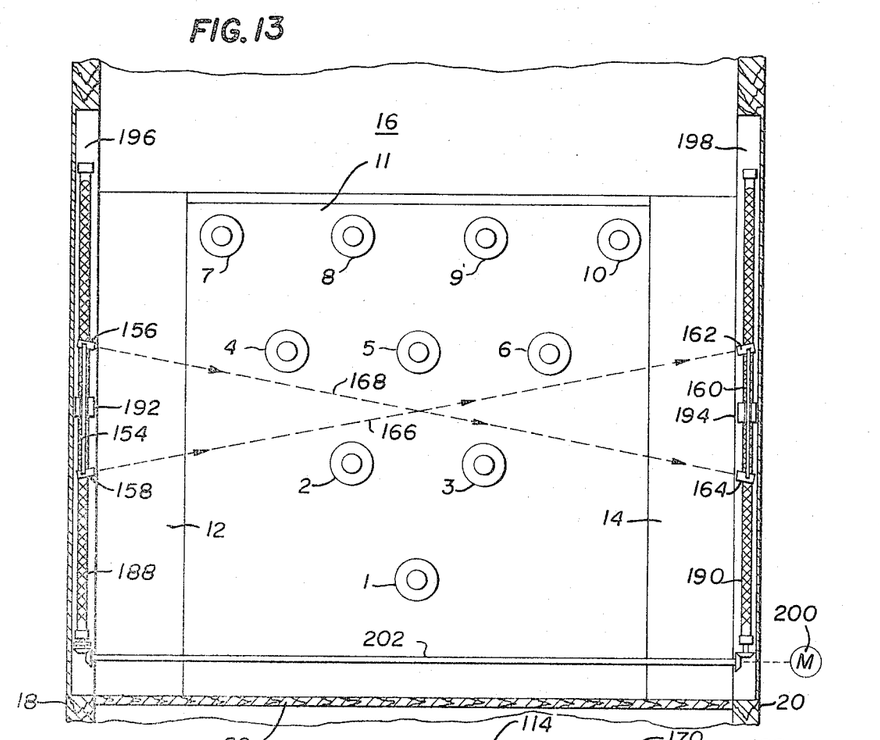
FIG. 13 is a top view of another arrangement for detecting standing pins employing photoelectric devices.

With reference now to FIG. 13, an embodiment of the invention is shown which operates upon the same principle as that shown in FIGS. 10 and 11, but wherein the scanning bar is eliminated. In this case, the bar is replaced by a pair of screw drives 188 and 190 on either side of the pin deck 11. The screw drives 188 and 190 are of the type which can be rotated in one direction to cause followers 192 and 194 to traverse the screws in one direction until the end of the screws are reached, whereupon the followers will reverse and return to their starting positions without reversing the direction of rotation of the screws. As shown, the screw drives 188 and 190 are recessed within slots 196 and 198 in kickbacks 18 and 20 to protect them from flying pins.

Carried on the followers 192 and 194 are the cross members 154 and 160 which carry at their opposite ends the lamps 156, 158 and photocells 162, 164, respectively. The screw drives 188 and 190 are driven synchronously by a motor 200 connected to the drives through suitable bevel gearing and a cross shaft 202 in front of the facing board 22. Thus, as the motor 200 rotates, the followers 192 and 194 are caused to reciprocate back and forth on opposite sides of the pin deck 11 while maintaining the required angularity between elements 156, 158 and 162, 164.

As an alternative to the arrangement shown in FIG. 13, the screw drives 188 and 190 could be replaced by chains rotatable about sprockets at opposite edges of the pin deck. In this latter case, however, a reversible drive motor would have to be employed to cause reciprocation. The cross members 154 and 160 in this latter case would be mounted on the chains and the chains driven synchronously by a cross shaft, similar to shaft 202 shown in FIG. 13, to maintain the required angularity between elements 156, 158 and 162, 164.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In pinfall detecting apparatus of the type in which a bar member having standing pin detecting means thereon is moved across the tops of standing pins on a bowling alley pin deck; the improvement in means for moving said member across the tops of standing pins comprising a pair of elongated members pivotally connected intermediate their ends in a scissors-like arrangement, means pivotally connecting one end of each of said elongated members to said bar member at spaced points thereon, means for moving the other ends of said elongated members toward or away from each other along a fixed straight-line path of travel at one edge of the pin deck whereby the bar member will be caused to move outwardly over the tops of the pins upon movement of said other ends toward each other and will be caused to move in the opposite direction over the tops of the pins upon movement of said other ends away from each other, and means associated with said elongated members for insuring that the bar member remains in a central location and does not change angles as it traverses the pin deck.

2. In pinfall detecting apparatus of the type in which a bar member having standing pin detecting means thereon is moved across the tops of standing pins on a bowling alley pin deck; the improvement in means for moving said member across the tops of standing pins comprising a pair of elongated members pivotally connected intermediate their ends in a scissors-like arrangement, means pivotally connecting one end of each of said elongated members to said bar member at spaced points thereon, a support structure extending parallel to one transverse dimension of the pin deck at one edge thereof and above pins positioned on the pin deck, a pair of carriages supported on said structure for movement toward or away from each other, means for moving said carriages toward and away from each other, means pivotally connecting the other ends of said elongated members to the respective carriages whereby movement of the carriages toward each other on said support structure will cause the bar member to move outwardly over the tops of the pins while movement of the carriage away from each other along said support structure will cause the bar member to move in the opposite direction over the tops of the pins, and cable means connected to said bar member and said support structure for insuring that the bar member remains in a central location relative to the pin deck and does not change angles as it traverses the pin deck.

3. The improvement of claim 2 wherein said support structure is above the tops of standing pins on the pin deck at the forward edge thereof and wherein the bar member moves along a path of travel extending parallel to the long transverse dimension of the bowling alley associated with said pin deck.

4. In apparatus for detecting standing pins on a bowling alley pin deck, an elongated member having a length substantially equal to the length of one transverse dimension of the pin deck and reciprocable along a substantially horizontal path across the tops of the pins along the other transverse dimension of the pin deck, a plurality of spaced pin detecting devices carried on said elongated member, each of said devices being adapted to detect pins within a predetermined zoned area of the pin deck as the member moves across the pin deck, said detecting devices being movable axially along the elongated member between first and second positions, means for moving said elongated member across the pin deck with said detecting devices in a first of their positions, means for shifting said detecting devices from their first to their second positions after the elongated member has traversed the pin deck in one direction, means for thereafter moving the elongated member across the pin deck with the detecting devices in their second positions whereby the zoned area covered by each detecting device as the elongated member moves in one direction will be different from that which it covers as the elongated member moves in the opposite direction, and means for comparing the number of pins detected by the detecting devices upon movement of the elongated member in opposite directions and for establishing a value equal to the smallest number of pins detected in the respective sweeps of the elongated member.

5. In apparatus for detecting standing pins on a bowling alley pin deck, an elongated member having a length substantially equal to the length of one transverse dimension of the pin deck and reciprocable along a substantially horizontal path across the tops of the pins along the other transverse dimension of the pin deck, a plurality of spaced pin detecting devices carried on said elongated member, each of said detecting devices being adapted to produce an electrical pulse as it passes over the end of a standing pin within a predetermined zoned area of the pin deck as the member moves across the pin deck, said detecting devices being movable axially along the elongated member between first and second positions, means for moving said elongated member across the pin deck with said detecting devices in a first of their positions, electrical circuit means for storing the total number of pulses produced by all detecting devices when said elongated member moves across the pin deck, means for shifting said detecting devices from their first to their second positions after the elongated member has traversed the pin deck in one direction, means for thereafter moving the elongated member across the pin deck with the detecting devices in their second positions, and means for electrically comparing the respective numbers of pulses produced by the detecting devices upon movement of said elongated member in opposite directions and for deriving an output signal comprising a number of pulses equal to the smallest of the two numbers of pulses compared.

6. Apparatus for detecting standing pins on a bowling alley pin deck comprising a photocell movable along one edge of the pin deck, a source of light movable along the opposite edge of the pin deck in synchronism with said photocell and arranged to direct a beam of light against the photocell, means for moving the photocell and light source along opposite edges of the pin deck, said photocell and light source being positioned above the pin deck such that the beam of light will be interrupted by standing pins as the photocell and light source move in synchronism along opposite edges of the pin deck, circuit means coupled to said photocell for producing an electrical pulse each time the light beam is interrupted, and means for indicating the number of said pulses to thereby indicate the number of standing pins on the pin deck.

7. Apparatus for detecting standing pins on a bowling alley pin deck comprising a photocell movable along one edge of the pin deck, a source of light movable along the opposite edge of the pin deck in synchronism with said photocell and arranged to direct a beam of light against the photocell, means for moving the photocell and light source along opposite edges of the pin deck, said beam of light being disposed at an angle to the transverse dimension of the pin deck between said opposite edges whereby the light beam will normally be interrupted by only one pin at any one time except for sliding pins as it moves along said edge, circuit means coupled to said photocell for producing an electrical pulse each time the light beam is interrupted, and means for indicating the number of said pulses and hence the number of standing pins.

8. Apparatus for detecting standing pins on a bowling alley pin deck comprising a plurality of photocells movable along one edge of the pin deck, a plurality of light sources movable along the opposite edge of said pin deck in synchronism with said photocells, means for moving the photocells and light sources along opposite edges of the pin deck respectively, each of said light sources being positioned to direct a light beam against an associated one of said photocells at an angle with respect to the side-to-side transverse dimension of the pin deck such that each light beam will normally be interrupted by only one pin at any one time, and circuit means coupled to said photocells for indicating the number of standing pins.

9. In pinfall detecting apparatus of the type in which a bar member having standing pin detecting means thereon is moved across the tops of standing pins on a bowling alley pin deck; the improvement in means for moving said member across the tops of standing pins comprising a pair of elongated members pivotally connected intermediate their ends in a scissors-like arrangement, means pivotally connecting one end of each of said elongated members to said bar member at spaced points thereon, a support structure extending parallel to one transverse dimension of the pin deck at one edge thereof and above pins positioned on the pin deck, a pair of carriages supported on said structure for movement toward or away from each other, means pivotally connecting the other ends of said elongated members to the respective carriages whereby movement of the carriages toward each other will cause the bar member to move outwardly over the tops of standing pins on the pin deck while movement of the carriages away from each other will cause the bar member to move across the tops of the pins in the opposite direction, fluid motor means for selectively causing said carriages to move toward or away from each other, racks on said carriages facing each other, and a pinion gear intermediate said racks and meshed therewith.

References Cited by the Examiner

UNITED STATES PATENTS

| | | | |
|---|---|---|---|
| 682,932 | 9/1901 | Haltom | 254—122 |
| 960,022 | 5/1910 | Kelemen et al. | 14—45 |
| 2,595,988 | 5/1952 | Simpson | 273—43 |
| 2,937,003 | 5/1960 | Croll | 254—122 X |
| 3,140,872 | 7/1964 | Bolger | 273—54 |
| 3,158,371 | 11/1964 | Kemp | 273—54 |
| 3,160,228 | 12/1964 | Steed | 254—122 X |

FOREIGN PATENTS 306,671   7/1955   Switzerland.

RICHARD C. PINKHAM, *Primary Examiner.*

ANTON O. OECHSLE, *Examiner.*